United States Patent [19]

Sako

[11] Patent Number: 5,327,406
[45] Date of Patent: Jul. 5, 1994

[54] DATA RECORDING METHOD AND DATA RECORDING MEDIUM

[75] Inventor: Yoichiro Sako, Chiba, Japan
[73] Assignee: Sony Corporation, Tokyo, Japan
[21] Appl. No.: 862,453
[22] Filed: Apr. 2, 1992
[30] Foreign Application Priority Data
  Apr. 5, 1991 [JP] Japan .................. 3-100385
[51] Int. Cl.$^5$ ............................. G11B 7/00
[52] U.S. Cl. .................. 369/32; 369/44.26; 369/275.3
[58] Field of Search ............. 369/44.26, 109, 111, 369/275.3, 32

[56] References Cited

U.S. PATENT DOCUMENTS 4,644,418  2/1987  Banno et al. ............... 360/39
4,967,403  10/1990  Ogawa et al. ............. 369/44.26
5,166,921  11/1992  Matsui ..................... 369/275.3

FOREIGN PATENT DOCUMENTS

0246485A3  11/1987  European Pat. Off. .
0258059A2  3/1988   European Pat. Off. .
0364176A3  4/1990   European Pat. Off. .

OTHER PUBLICATIONS

Machine Design, vol. 62, No. 19, Sep. 20, 1990, Cleveland, Ohio, USA, pp. 92-96, XP000165428, Al Morton: "Increasing Disk-drive Capacity."
Applied Optics, vol. 25, No. 22, Nov. 15, 1986, pp. 3996-4000. Yoichiro Sako and Tadao Suzuki: "Data Structure of the Compact Disk-read-only Memory System."

Primary Examiner—Tony M. Argenbright
Attorney, Agent, or Firm—Limbach & Limbach

[57] ABSTRACT

An address unit is provided so that integer multiples of the address unit correspond to respective sector capacities of plural kinds of formats (such as the ISO format and the CD format) which are different in sector size. In this fashion, by multiplying the address unit by an integer, a sector of a respective one of plural kinds of formats can readily be accessed.

8 Claims, 3 Drawing Sheets

DATA RECORDING METHOD AND DATA RECORDING MEDIUM

BACKGROUND OF THE INVENTION

1. Field of the Invention

This invention relates to a data recording method and a data recording medium for sharing, for example, data on an optical disc of the ISO format and data on an optical disc of the CD format.

2. Description of the Prior Art

The format of continuous servo type optical discs of 3.5 inches and 5 inches is standardized by ISO (International Organization for Standardization). Optical discs of the ISO format have now been put in use as an external storage device of a computer.

On the other hand, paying attention to a CD (compact disc) being a recording medium capable of storing a large amount of data, optical discs (CD-ROM, CD-I, and so forth) for storing data in the CD format have already been spread. Therefore, two kinds of optical discs in a general classification, optical discs of the ISO format and optical discs of the CD format, are currently distributed.

An optical disc of the ISO format and an optical disc of the CD format are completely different in format. Therefore, when it is intended to share data on a disc recorded in the ISO format and data on a disc recorded in the CD format, an inconvenience occurs. Since enormous software resources and data resources have already been built by using optical discs of the ISO format and optical discs of the CD format, respectively, it is difficult under the present situation to decide between the two formats of optical discs.

It is therefore desired to develop an optical disc which permits the ISO format and the CD format to be shared.

In the ISO format, for example, the capacity of one sector is 1200 bytes (user data capacity: 1024 bytes) or 600 bytes (user data capacity: 512 bytes). On the other hand, in the CD format, a block consisting of 98 frames is regarded as one sector. The data capacity of one block (sector) is 2352 bytes. When sub-codes are included, the capacity of one block is 2450 bytes, when error correction codes and others are included, the capacity of one block is 3136 bytes, when sub-codes, error correction codes and others are included, the capacity of one block is 3234 bytes.

An optical disc permitting the shared use of the ISO format and the CD format must cope with two kinds of formats which are different in sector size as explained above. More specifically, it is necessary for such a disc not only that each sector of 1200 bytes can be accessed to for performing recording and reproduction of data in the ISO format but also that each sector (block) of, for example, 3136 bytes excluding sub-codes can be accessed to for performing recording and reproduction of data in the CD format.

OBJECTS AND SUMMARY OF THE INVENTION

It is, therefore, an object of the invention to provide a data recording method and a data recording medium capable of setting sectors respectively in accordance with plural kinds of formats, respectively, which are different in sector size.

According to an aspect of the invention, there is provided a data recording medium capable of recording data of a first data format in which one sector comprises a first data amount and data of a second data format in which one sector comprises a second data amount, wherein one of common divisors of the first data amount and the second data amount is selected to be a data amount of an address unit and an address is preliminarily recorded for each the address unit.

According to another aspect of the invention, there is provided a data recording method for recording data of a first data format in which one sector comprises a first data amount and data of a second data format in which one sector comprises a second data amount onto the same recording medium, wherein on the recording medium, by selecting one of common divisors of the first data amount and the second data amount to be a data amount of an address unit, an address is preliminarily recorded for each the address unit, a sector of the first data format is accessed to by incrementing the address by a first integer, and a sector of the second data format is accessed to by incrementing the address by a second integer.

An address unit is provided so that integer multiples of the address unit correspond to both the sector size of the ISO format and the sector size of the CD format. As a result, both a sector of the ISO format and a sector of the CD format can easily been accessed in the same recording medium.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

An embodiment of the invention is explained below with reference to the drawings.

Figure 1:
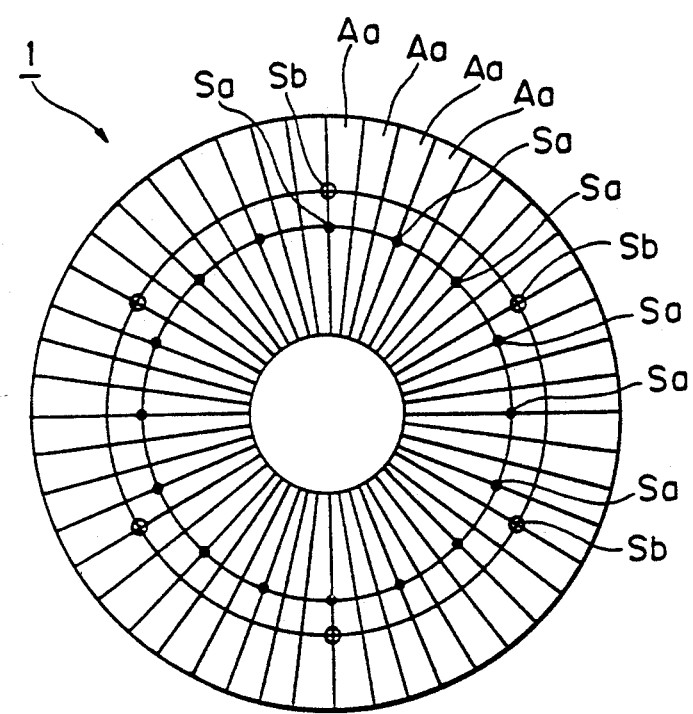
FIG. 1 is a plan view of an example of an optical disc to which the invention is applied.

FIG. 1 shows an example of an optical disc to which the invention is applied. On the optical disc 1 is provided an address unit Aa, Aa, Aa, . . . for every 400 bytes. In each address unit Aa, Aa, Aa . . . is preliminarily provided an address. By using the address for each address unit Aa, Aa, Aa, . . . upon recording and reproduction of data, both a sector of the ISO format and a sector of the CD format can be accessed.

In case of accessing to a sector of the ISO format, the address unit Aa is progressed three by three. Since the size of one address unit is 400 bytes, sectors are set for every 1200 bytes by progressing the address unit three by three. Since the size of one sector of the ISO format is 1200 bytes in term of the data capacity, by setting a sector for every 1200 bytes, leaders Sa, Sa, Sa, . . . of respective sectors of the ISO format can be accessed.

In case of accessing to a sector of the CD format, the address unit Aa is progressed eight by eight. Since one address unit is 400 bytes, a sector is set for every 3200 bytes by progressing the address unit eight by eight. Since the size of one sector of the CD format is 3136 bytes excluding the sub-codes, by setting a sector for every 3200 bytes, leaders Sb, Sb, Sb, ... of respective sectors of the CD format can be accessed.

The size of the address unit Aa is set so that integer multiples of the address unit Aa are substantially equal, respectively, to different sector sizes of two formats. In this case, it is hoped that an integer multiple of the address unit should be equal to the size of one sector of the ISO format (1200 bytes), and another integer multiple of the address unit to the size of one sector of the CD format (3136 bytes). However, since no address unit of an appropriate size can be set for 1200 bytes and 3136 bytes, the size of one sector of the CD format is regarded to be 3200 bytes, and the address unit is set to 400 bytes.

Figure 2:
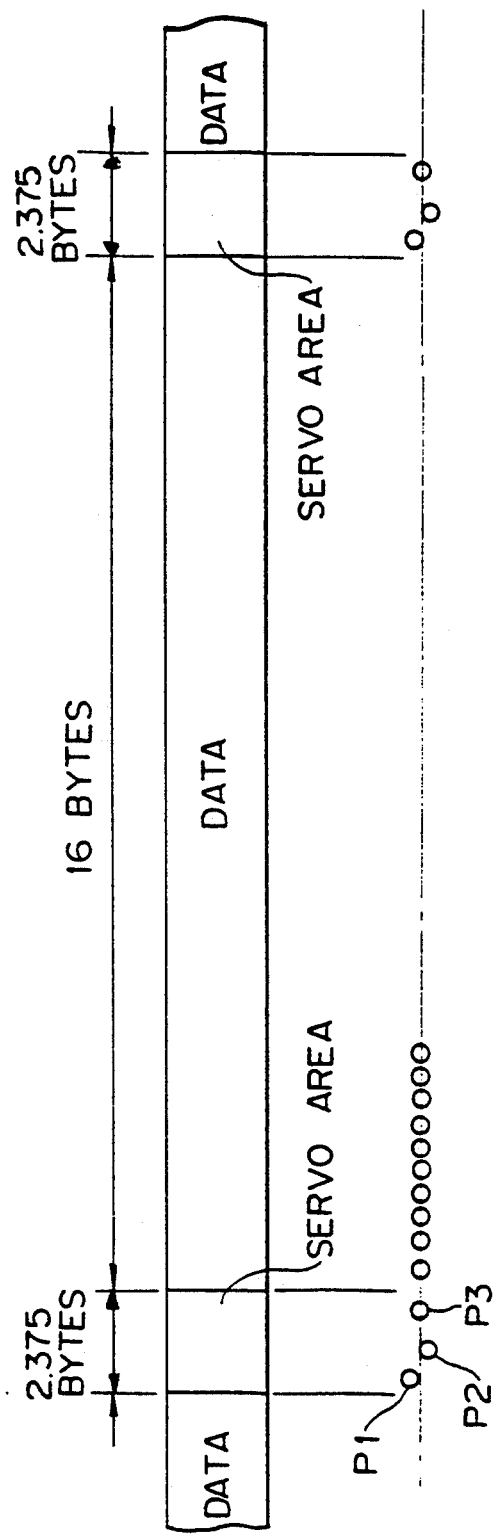
FIG. 2 is a schematic view for use in explanation of the example of an optical disc to which the invention is applied.

The invention can be applied not only to the continuous servo system but also to the sample servo system. In this case, the address unit Aa is set to be an integer multiple of the number of data in a segment. As shown in FIG. 2, each segment includes a servo area of 2.375 bytes and a data area of 16 bytes. The servo area includes wobble pits P1 and P2 for tracking, and a clock playback pit P3. An integer multiple (in this example, twenty five (25) multiple) of the number of data in the segment, 16 bytes ($16 \times 25 = 400$ bytes), is selected as the size of the address unit Aa.

As explained above, the size of the address unit is set to an integer multiple of data in a segment. Integer multiples of the address unit are sector sizes in the ISO format and the CD format. Therefore, integer multiples of data in a segment are sector sizes in the ISO format and the CD format.

In case of the sample servo system mentioned above, if a servo area has a defect, errors tend to concentrate in the segment. In the event that errors concentrate in a certain segment, management of error information is easy when an integer multiple of data in the segment is the sector size.

Figure 3:
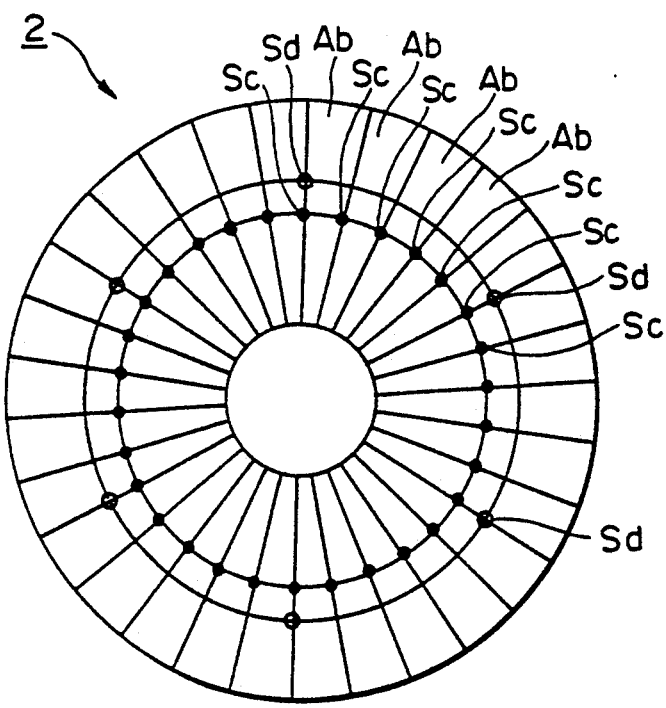
FIG. 3 is a plan view of a further example of an optical disc to which the invention is applied.

FIG. 3 is another example of optical disc to which the invention is applied. In this example, the optical disc 2 is adapted to cope with the ISO format in which one sector is 600 bytes and the CD format. On the optical disc 2 is provided an address unit Ab, Ab, Ab, ... for every 640 bytes. An address is preliminarily provided for each address unit Ab, Ab, Ab, ... By using the address for each address unit Ab, Ab, Ab, ..., both a sector of the ISO format and a sector of the CD format can be accessed.

In order to access to a sector of the ISO format, the address unit Ab is progressed one by one. Since the size of the address unit Ab is 640 bytes, by progressing the address unit Ab one by one, a sector is set for every 640 bytes. Since the size of one sector of the ISO format is 600 bytes in terms of the data capacity (user data is 512 bytes), by setting a sector for every 640 bytes as explained above, leaders Sc, Sc, Sc, ... of respective sectors of the ISO format can be accessed.

In order to access to a sector of the CD format, the address unit Ab is progressed five by five. Since the address unit Ab is 640 bytes, by progressing the address unit Ab five by five, a sector is set for every 3200 bytes. Since the size of one sector of the CD format is 3136 bytes including error correction codes, by setting a sector for every 3200 bytes as explained above, leaders Sd, Sd, Sd, ... of respective sectors of the CD format can be accessed.

In the case where the invention is applied to the sample servo system, the size of the address unit (640 bytes) is selected to be an integer multiple of the number of data (16 bytes) in a servo area. Therefore, when errors concentrate in a certain segment, management of error information is easy.

Figure 4:
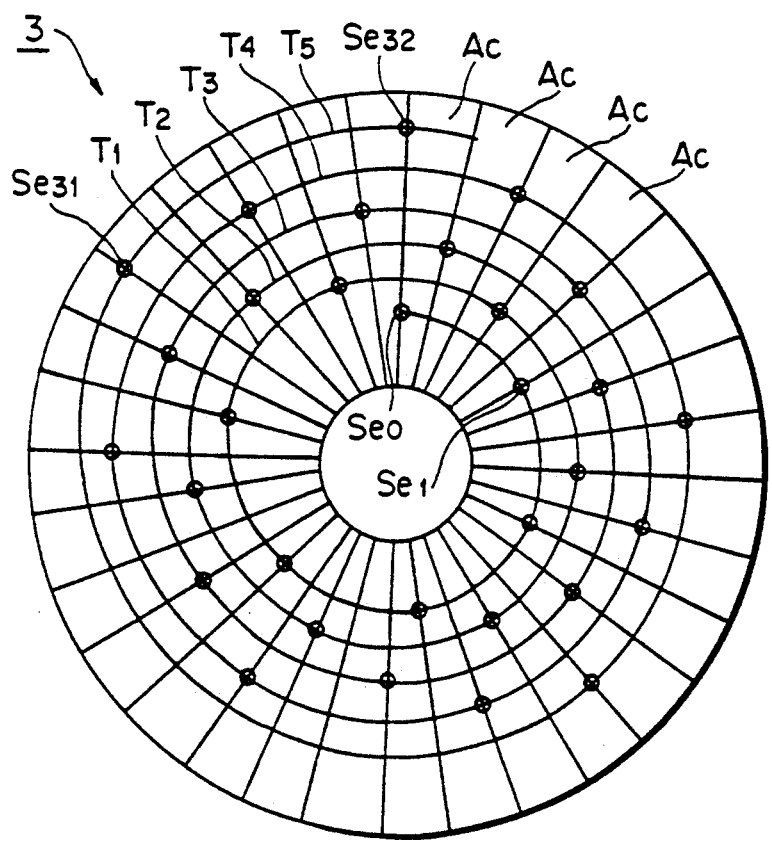
FIG. 4 is a plan view of a still further example of an optical disc to which the invention is applied.

It is possible that an integer number of sectors set by multiplying the address unit by an integer cannot be put in one track. For example, as shown in FIG. 4, one track on the optical disc 3 includes 32 address units Ac. When sectors are made by progressing the address unit Ac five by five, an integer number of sectors may not be made in one track. In this case, a desired sector is accessed to in the following manner.

The address of the address unit Ac is assigned with a track number n and an intra-track address number m. In this case, a desired address (n, m) is obtained as follows: Under the following definitions:
L: number of address units per sector;
M: number of address units per track;
N: number of full unit tracks (in general, L=N);
K: number of sectors in N tracks (in general, M=K);

in order to access to the i-th sector, the following calculation is performed:

$$j32 \ [i/K]$$

$$k = i - j \times K$$

$$l = [k \times L/M]$$

$$m = (k \times L) - l \times M$$

$$n = j \times N + l$$

where [ ] represents the calculation taking an integer.

For instance, in the example of FIG. 4, the number of the address unit Ac per sector is five (5). Thirty two (32) address units are provided per track. The start position of a sector is restored in five tracks $T_1$ to $T_5$, and the number of sectors $S_{e0}$ to $S_{e31}$ in these five tracks $T_1$ to $T_5$ is thirty two (32). This results in:
L=5
M=32
N=5
K=32

This therefore results in:

$$j = [i/32]$$

$$k = i - j \times 32$$

$$l = [k \times 5/32]$$

$$m = (k \times 5) - l \times 32$$

$$n = j \times 5 + l$$

Here, in order to access to the 50th sector (i=50), the values are:

$$j = [50/32] = 1]$$

$$k = 50 - 1 \times 32 = 18$$

$$l = [18 \times 5/32] = 2$$

$$m=(18\times 5)-2\times 32=26$$

$$n=\times 5+2=7$$

Then the track number 7 and the intra-track address 26 can be accessed.

According to the invention, since an address unit is provided so that integer multiples of the address unit correspond to the sector size of the ISO format and the sector size of the CD format, both a sector of the format and a sector of the CD format can readily been accessed. Therefore, it is not necessary to prepare different recording media corresponding to each format and a single recording medium can be used.

It should be noted that the invention is not limited to the ISO format and the CD format. Further, the invention can be applied to a magnetic disk, a card and others.

What is claimed is:

1. A data recording medium capable of recording data of a first data format in which one sector comprises a first data amount and data of a second data format in which one sector comprises a second data amount,
    wherein a common divisor of said first data amount and said second data amount is selected to be a data amount of an address unit and an address is preliminarily recorded for each address unit.

2. A data recording medium according to claim 1, wherein user data of one sector of said first data format is 512 bytes.

3. A data recording medium according to claim 1, or 2, wherein user data of one sector of said second data format corresponds to data of 98 frames of a compact disc.

4. A data recording medium capable of recording data of a first data format in which one sector comprises a first data amount and data of a second data format in which one sector comprises second data amount,
    wherein servo information is preliminarily recorded for each segment which is obtained by dividing data of one sector in data format, and
    wherein a common divisor of said first data amount and said second data amount which is an integer multiple of data amount in said segment is selected to be a data amount of an address unit and an address is preliminarily recorded for each address unit.

5. A data recording medium according to claim 4, wherein user data of one sector of said first data format is 512 bytes.

6. A data recording medium according to claim 5, wherein data in one segment of said first data format is 16 bytes.

7. A data recording method for recording data of a first data format in which one sector comprises a first data amount and data of a second data format in which one sector comprises a second data amount onto the same recording medium, the method comprising the steps of:
    preliminarily recording an address for each address unit on said recording medium, by selecting a common divisor of said first data amount and said second data amount to be a data amount of an address unit,
    accessing a sector of said first data format by incrementing said address by a first integer, and
    accessing a sector of said second data format by incrementing said address by a second integer.

8. A data reproducing method for reproducing data from a recording medium on which data of a first data format in which one sector comprises a first data amount and data of a second data format in which one sector comprises a second data amount are recorded, the method comprising the steps of:
    preliminarily recording an address for each address unit on said recording medium, by selecting a common divisor of said first data amount and said second data amount to be a data amount of an address unit,
    accessing a sector of said first data format by incrementing said address by a first integer, and
    accessing a sector of said second data format by incrementing said address by a second integer.

* * * * *